(12) United States Patent
Yang et al.

(10) Patent No.: US 11,476,592 B2
(45) Date of Patent: Oct. 18, 2022

(54) ANTENNA MODULE AND ANTENNA HOUSING

(71) Applicant: Taoglas Group Holdings Limited, San Diego, CA (US)

(72) Inventors: Tsai-Yi Yang, Taoyuan (TW);
Yung-Sheng Tseng, Taoyuan (TW);
Bo-Yuan Chang, Taoyuan (TW);
Sheng-Shen Chang, Taoyuan (TW);
Yu-Hua Chen, Taoyuan (TW);
Shih-Shih Chien, Taoyuan (TW);
En-Chin Wei, Taoyuan (TW)

(73) Assignee: TAOGLAS GROUP HOLDINGS LIMITED, Enniscorthy (IE)

( * ) Notice: Subject to any disclaimer, the term of this patent is extended or adjusted under 35 U.S.C. 154(b) by 184 days.

(21) Appl. No.: 16/939,752

(22) Filed: Jul. 27, 2020

(65) Prior Publication Data
US 2021/0028561 A1 Jan. 28, 2021

(51) Int. Cl.
*H01Q 21/30* (2006.01)
*H04W 88/06* (2009.01)
*H01Q 21/28* (2006.01)
*H01Q 9/08* (2006.01)

(52) U.S. Cl.
CPC ............... *H01Q 21/30* (2013.01); *H01Q 9/08* (2013.01); *H01Q 21/28* (2013.01); *H04W 88/06* (2013.01)

(58) Field of Classification Search
CPC .......... H01Q 21/28; H01Q 9/08; H01Q 21/30; H01Q 21/20
See application file for complete search history.

*Primary Examiner* — Graham P Smith
(74) *Attorney, Agent, or Firm* — Garson & Gutierrez, PC (57) ABSTRACT

An antenna module includes an antenna box and a first connection wire. The antenna box can include a first antenna, a second antenna, a first connection terminal, a second connection terminal and a housing. The first and second antennas are located in the housing and the housing has a first opening collectively exposing a portion of the first connection terminal and a portion of the second connection terminal. Each of the first and second antennas is adapted to receive or transmit wireless signals according to one of a plurality of wireless communication standards and the first and second antennas are electrically connected to the first and second connection terminals, respectively. The wireless communication standards can be different from each other.

20 Claims, 11 Drawing Sheets

ANTENNA MODULE AND ANTENNA HOUSING

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims priority under 35 U.S.C. § 119(a) to Taiwanese Patent Application No. 108126567 filed on Jul. 26, 2019 and Taiwanese Patent Application No. 108137885 filed on Oct. 21, 2019, each of which is hereby incorporated by reference in its entirety.

BACKGROUND

Field of the Disclosure

Embodiments described herein relate to antenna devices, and in particular to an antenna module and an antenna box.

Description of the Related Art

An antenna box, or an antenna housing, can include at least one antenna and at least one connection wire connecting the antenna housed within the antenna box to a connection terminal.

SUMMARY

Embodiments described herein provide an antenna module and an antenna box comprising a plurality of antennas, particularly different antennas, supporting different wireless communication standards.

In a first broad aspect, an antenna box module is provided, comprising an antenna box and a first connection wire. The antenna box comprises a first antenna, a second antenna, a first connection terminal, a second connection terminal and a housing. The first and second antennas are located in the housing, and the housing has a first opening exposing collectively a portion of the first connection terminal and a portion of the second connection terminal. Each of the first and second antennas is adapted to receive or transmit wireless signals according to one of a plurality of wireless communication standards. The first and second antennas are electrically connected to the first and second connection terminals, respectively and the wireless communication standards are different from each other. One end of the first connection wire is adapted to being connected to the first connection terminal such that the first antenna is adapted to be electrically connected to the first connection wire by means of the connection of the first connection terminal with the first connection wire.

The end of the first connection wire can be adapted to be connected to the first connection terminal by means of insertion or thread-locking or fitting fastening.

The first opening can be located on a side surface, a top surface or a bottom surface of the housing.

The antenna box can further include a plurality of other antennas and a plurality of other connection terminals, and the other antennas are electrically connected to the other connection terminals, respectively. The first opening further exposes collectively a portion of each of the other connection terminals, and the first, second and other connection terminals are arranged in parallel in a row or multiple rows.

The housing further has a second opening exposing collectively a portion of each of the other connection terminals, and the first and second opening are located on different surfaces of the housing.

The antenna box can further include a circuit board. The first and second antennas and the first and second connection terminals are disposed on the circuit board. The first and second connection terminals are disposed on the circuit board by means of soldering or insertion.

The antenna box can further include a first connector. The first and second connection terminals are disposed at the first connector. The antenna box further comprises a connection wire module comprising the first connection wire, a second connection wire and a second connector. The end of the first connection wire and one end of the second connection wire are connected to the second connector. The second connector is adapted to be connected to the first connector such that simultaneously, the first antenna is adapted to be electrically connected to the first connection wire by means of the connection of the first connector with the second connector and the second antenna is adapted to be electrically connected to the second connection wire by means of the connection of the first connector with the second connector.

In addition, the second connector is adapted to be connected to the first connector by means of magnetic force or screw-locking. Further, the first antenna is electrically connected to the first connection wire in an one-to-one fashion, and the second antenna is electrically connected to the second connection wire in an one-to-one fashion. Further, the first connector comprises a first common base. The first common base is partially disposed in the first opening and has a plurality of through holes. The first and second connection terminals are disposed at and thus occupy some or all of the through holes. Further, the first connector is provided for all the antennas in the antenna box. Further, the second connector comprises a second common base. The end of each of the first and second connection wires is disposed at the second common base. Further, the second common base has a first hole and a second hole. An orientation of the first hole and an orientation of the second hole are not arranged in parallel. Both of a portion of the first connection wire and a portion of the second connection wire are at least extended into a space between the first hole and the second hole.

In another broad aspect, an antenna box is provided, comprising a first antenna and a second antenna, a first antenna and a second antenna, and a housing. Each of the first and second antennas is adapted to receive or transmit wireless signals according to one of a plurality of wireless communication standards. The wireless communication standards are different from each other. The first antenna is electrically connected to the first connection terminal and the second antenna is electrically connected to the second connection terminal. The first and second antennas are located in the housing. The housing has a first opening exposing collectively a portion of the first connection terminal and a portion of the second connection terminal.

The first opening can be located on a side surface, a top surface or a bottom surface of the housing.

The antenna box can further include a plurality of other antennas and a plurality of other connection terminals. The other antennas are electrically connected to the other connection terminals, respectively. In addition, the first opening further exposes collectively a portion of each of the other connection terminals. The first, second and other connection terminals are arranged in parallel in a row or multiple rows. Further, the housing further has a second opening exposing collectively a portion of each of the other connection terminals. The first and second openings are located on different surfaces of the housing.

The antenna box can further include a circuit board. The first and second antennas and the first and second connection terminals are disposed on the circuit board. The first and second connection terminals are disposed on the circuit board by means of soldering or insertion.

The first antenna can be electrically connected to the first connection wire in an one-to-one fashion, and the second antenna is electrically connected to the second connection wire in an one-to-one fashion.

The antenna box can further include a connector. The connector comprises a common base. The common base is partially disposed in the first opening and has a plurality of through holes. The first and second connection terminals are disposed at and thus occupy some or all of the through holes.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1:
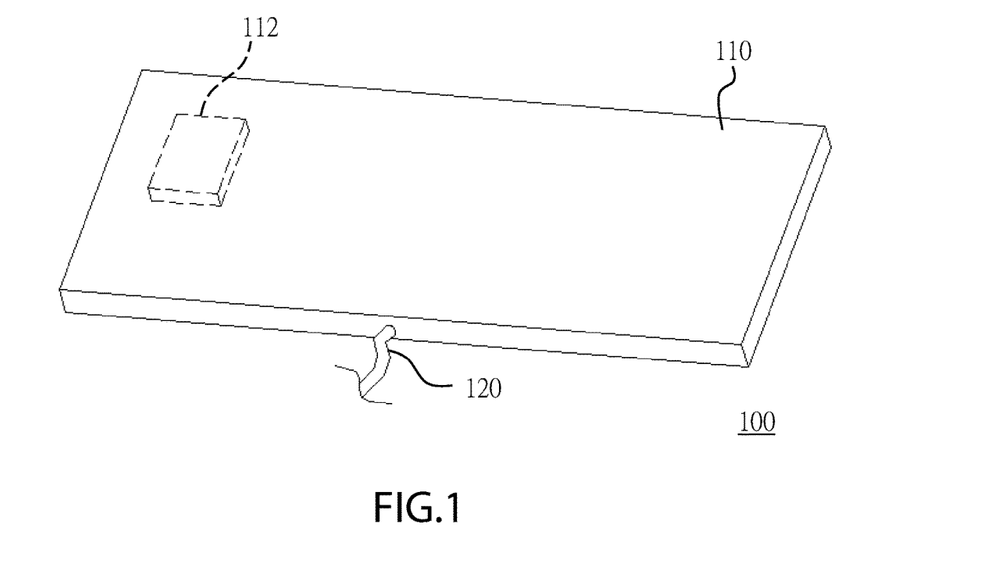
FIG. 1 is a perspective view of an embodiment of an antenna box module including a single antenna.

FIG. 1 is a perspective view of an embodiment of an antenna box module including a single antenna. The antenna box module 100 in FIG. 1 is used as an example for illustrating a connection mode for antenna signals. The antenna box module 100 includes an antenna box 110 and a single connection wire 120. The antenna box 110 includes a single antenna 112 adapted to receive and transmit multiple wireless signals according to Wi-Fi wireless communication standard. Further, the single antenna 112 is electrically connected to the single connection wire 120, and the signal connection wire 120 may be connected to a network card (not shown) of another external device.

However, the antenna box module 100 includes only the single connection wire 120, and the antenna box 110 and the single connection wire 120 are in a fixed connection. In addition, the antenna box module 100 includes only the single antenna 112 and thus supports only one wireless communication standard.

Figure 2:
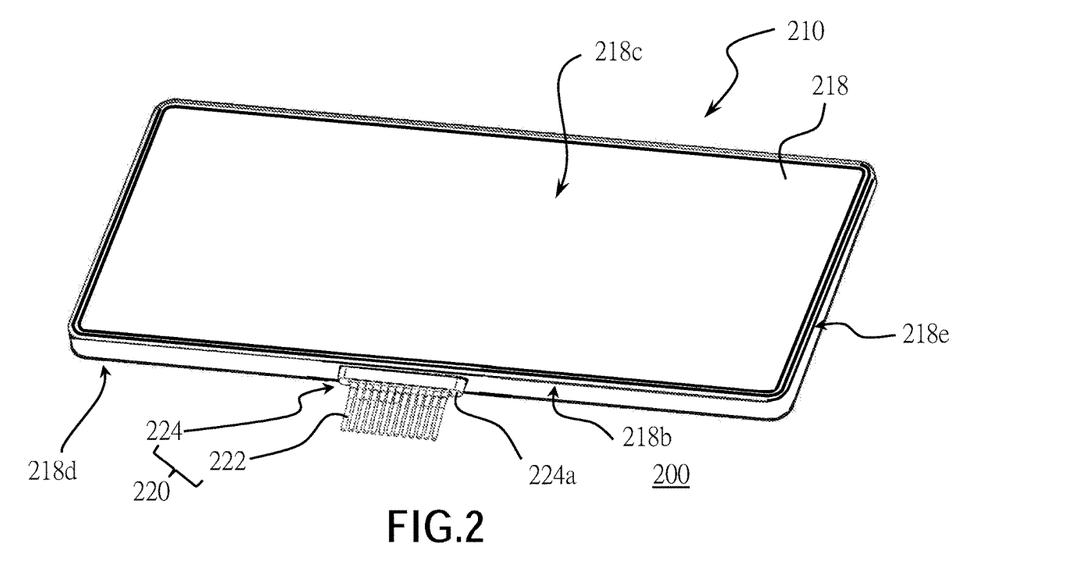
FIG. 2 is a perspective view schematically illustrating an embodiment of an antenna box module, illustrating a connection wire module connected to an antenna box.
Figure 3:
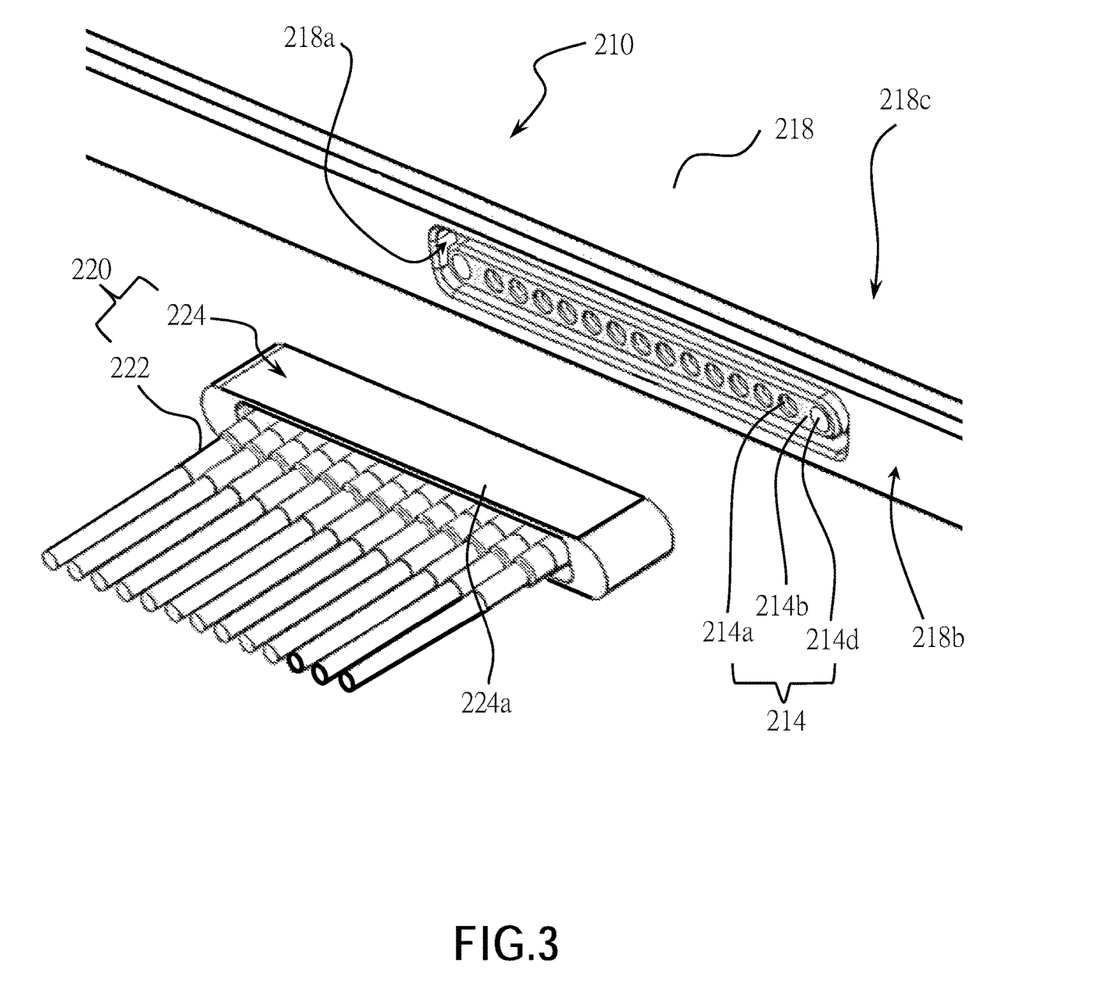
FIG. 3 is a detail perspective view schematically illustrating a section of the antenna box module of FIG. 2, in which the antenna box and the connection wire module are separated.
Figure 4:
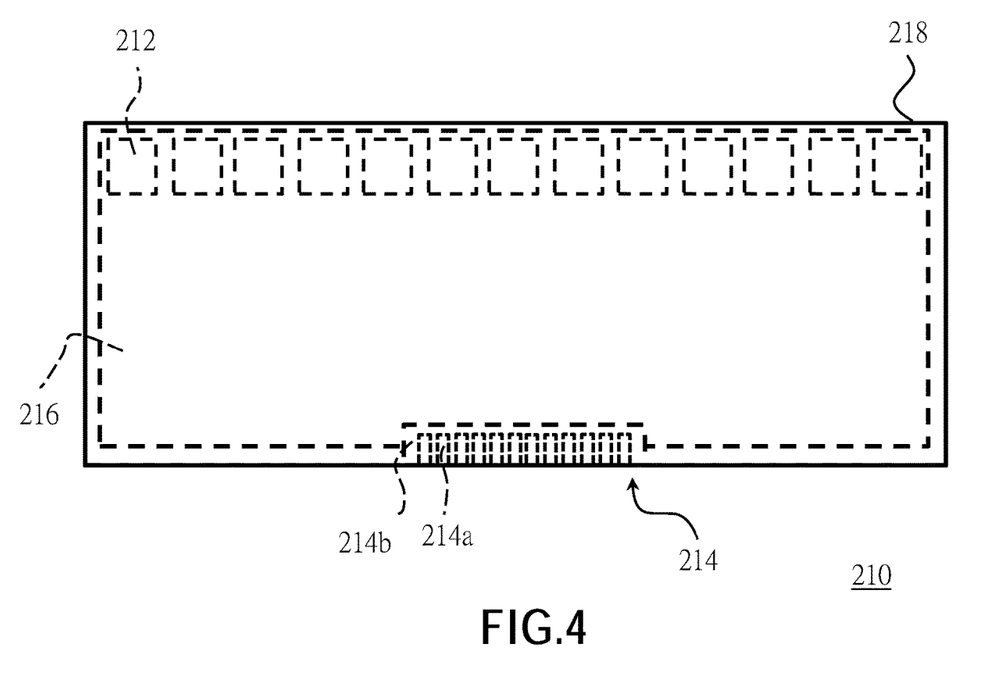
FIG. 4 is a top plan view schematically illustrating the antenna box of FIG. 2.

FIG. 2 is a perspective view schematically illustrating an embodiment of antenna box module, illustrating a connection wire module connected to an antenna box. FIG. 3 is a detail perspective view schematically illustrating a section of the antenna box module of FIG. 2, in which the antenna box and the connection wire module are separated. FIG. 4 is a top plan view schematically illustrating the antenna box of FIG. 2.

Like the antenna box 110 of FIG. 1, the antenna box 210 of FIG. 2 has a housing 218 with a generally planar, rectangular top surface 218c and a similarly dimensioned bottom surface 218d. In other embodiments, however, the top and bottom surfaces need not be planar, but may include some curvature. The antenna box 210 also includes a side surface 218b. In the illustrated embodiment, because the corners of the top surface 218c are rounded, the side surface 218b forms a part of a curved band surface extending around the edge of the antenna box 210, with the flat sections forming side surfaces such as longer side surface 218b and shorter side surface 218e. The antenna box 210 may include bevels or a similar curved transition between the top surface 218c and the side surfaces such as longer side surface 218b and shorter side surface 218e, and may include similar bevels or curved transitions on the underside of the antenna box 210.

Referring to FIG. 2 to FIG. 4, an antenna box module 200 includes an antenna box 210 and a connection wire module 220 configured to be connected to the antenna box 210. The antenna box 210 includes multiple antennas 212 and a first connector 214 dimensioned to allow the connection wire module 220 to be connected to the first connector 214. Each of the antennas 212 is adapted to receive and transmit wireless signals according to one of a plurality of wireless communication standards. In some embodiments, these antennas 212 are of different types. For example, based on these different wireless communication standards, these antennas 212 may have respectively corresponding structures. These wireless communication standards include, for example, the Wi-Fi wireless communication standard, Bluetooth wireless communication standard, GPS wireless communication standard, 2G wireless communication standard, 3G wireless communication standard, 4G wireless communication standard, 5G wireless communication standard and WiMAX wireless communication standard, and so on Further, the connection wire module 220 includes a second connector 224 and multiple connection wires 222. One end of each of the connection wires 222 is connected to the second connector 224. In this embodiment, the end of each of the connection wires 222 connected to the second connector 224 is disposed at a common base 224a of the second connector 224. The second connector 224 is adapted to be connected to the first connector 214 such that one of these antennas 212 is adapted to be electrically connected to one of these connection wires 222 via the connection between the first connector 214 with the second connector 224, and another of these antennas 212 is adapted to be electrically connected to another of these connection wires 222 via the connection between the first connector 214 with the second connector 224.

Figure 5A:
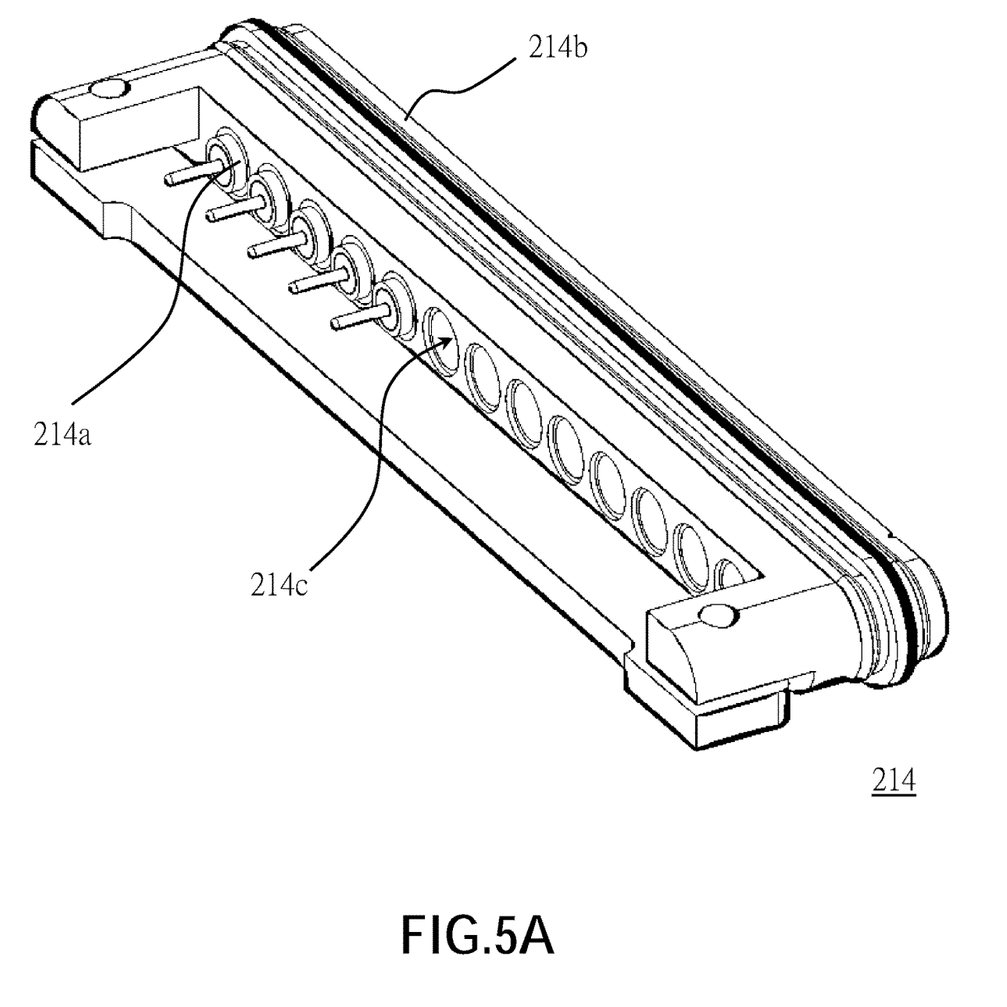
FIG. 5A is a perspective view schematically illustrating a connector such as the connector of FIG. 3.
Figure 5B:
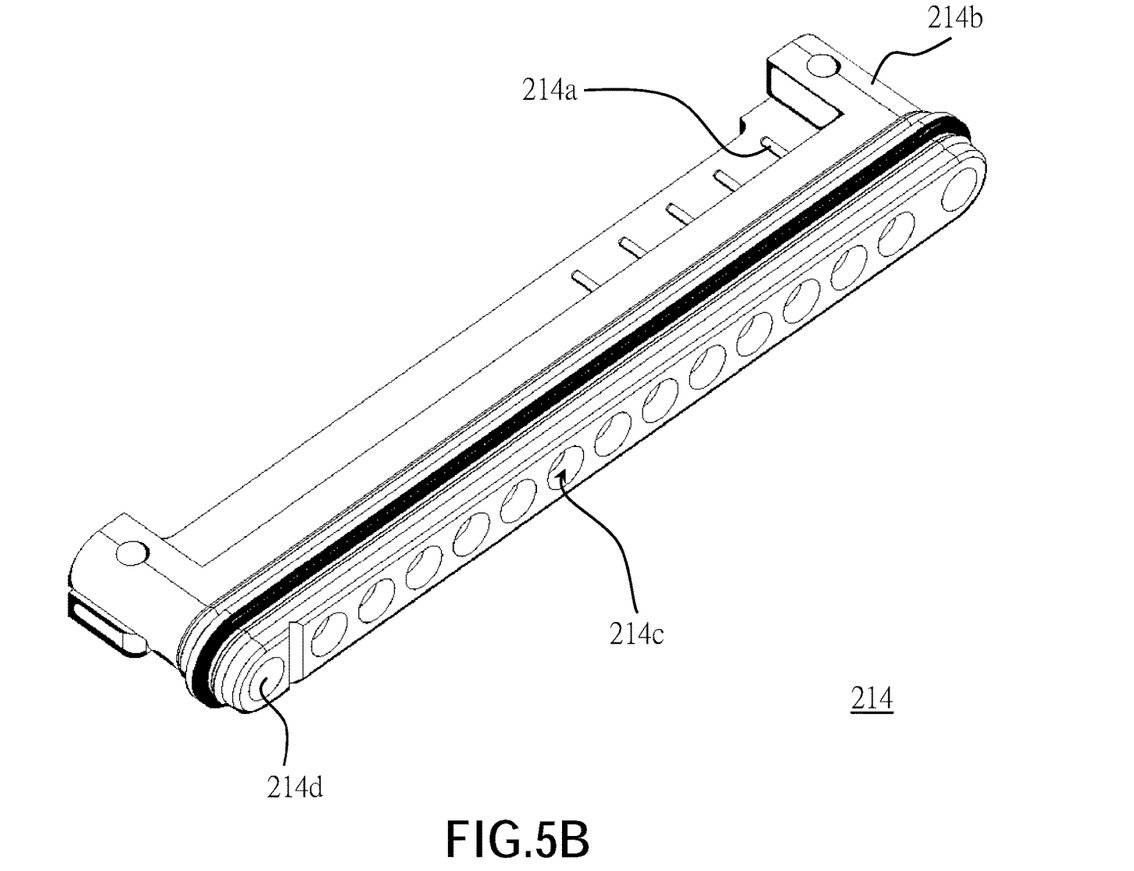
FIG. 5B is a perspective view schematically illustrating the connector of FIG. 5A.

In this embodiment, these antennas 212 are all antennas in the antenna box 210. In other words, all the antennas 212 in the antenna box 210 may be coupled to an external device commonly through the first connector 214, such that other additionally provided connectors are then not needed. Further, these antennas 212 and these connection wires 222 may be connected in one-to-one fashion, in which the number of these antennas 212 may be equal to the number of these connection wires 222, and each of the connection wires 222 may be electrically connected to one unique antenna 212 of these antennas 212. This description of an exemplary connection arrangement is non-limiting, and other connection arrangements may also be made FIG. 5A is a perspective view schematically illustrating a connector such as the connector of FIG. 3. FIG. 5B is a perspective view schematically illustrating the connector of FIG. 5A. Referring to FIG. 3 to FIG. 5B, the antenna box 210 further includes at least one circuit board 216 and a housing 218. These antennas 212 and the circuit board 216 are located in the housing 218. The housing 218 includes an opening 218a, and a portion of the first connector 214 is exposed outside the housing 218 through the opening 218a. In this embodiment, the material forming the housing 218 of the antenna box 210 includes a heat-resistant material, and is, for example, a plastic material, and may be a mixture of PA resin and ABS resin.

These antennas 212 are disposed on the circuit board 216 and electrically connected to the circuit board 216. The first connector 214 is disposed on or otherwise connected to the circuit board 216, and includes multiple connection terminals 214a and a common base 214b. In the illustrated embodiment, only five connection terminals 214a are illustratively depicted in FIG. 5A. The opening 218a of the housing 218 may accommodate the common base. However, in other embodiments, the common base 214b may be omitted. In such an embodiment, the connection terminals 214a may be directly electrically connected to the circuit board 216 by means of welding or another suitable connection.

The common base 214b is disposed on the circuit board 216 and has multiple through holes 214c. The number of the through hole 214c is not limited. In some embodiments, more than 10 through holes may be provided, and in other embodiments 13 or 17 through holes may be provided. In other embodiments, other numbers of through holes within, below, or above this range may be provided. In some embodiments, the number of the through holes 214c may be greater than or equal to the number of connection terminals 214a in the connector 214.

In some embodiments, as shown in the drawings, the through holes 214c are closely adjacent to one another and are arranged next to one another in the same direction, so as to save occupied space and to not increase the thickness of the housing 218. However, in other embodiments, these connection terminals 214a may be arranged in parallel in multiple rows, such as two or three rows, or may be arranged as a circle or in any other desired arrangement. Hence, correspondingly, these through holes 214c, as described in detail elsewhere herein, designed for accommodating these connection terminals 214a may be arranged accordingly in multiple rows, as a circle, or in any other desired pattern.

The common base 214b can be integrally formed. In some embodiments, the common base 214b may be formed of a metal or alloy material, such as zinc alloy. Zinc alloy is an example of a material with good casting performance, which can be die-casted as precision parts having complex shapes and thin walls. The use of such a material can be beneficial for the formation of a large number of through holes 214c in close arrangement. However, it should be noted that the disclosed technology is not limited to the above examples.

It should be noted that, depending on the number of these antennas 212 in practice, the multiple connection terminals 214a of the first connector 214 may be disposed in all or a portion of the through holes 214c so as to be electrically connected to the circuit board 216, and a portion of each connection terminal 214a may be exposed outside the housing 218 through the opening 218a of the housing 218 so as to be connected to an external device. In other words, the number of the through holes 214c may be more than the number of the connection terminals 214a. Thus, these through holes 214a of the common base 214b are adapted to multiple scenarios without needing to be adjusted, and are not limited by the number of these antennas 212 in practice. In some exemplary embodiments, the number of these through holes 214c may be more than that of the antennas 212.

One of these antennas 212 is electrically connected to one of these connection terminals 214a through the circuit board 216, and another of these antennas 212 is electrically connected to another of these connection terminals 214a through the circuit board 216. In this embodiment, these antennas 212 and these connection terminals 214a may be in one-to-one fashion in which the number of these antennas 212 may be equal to the number of these connection terminals 214a, and each of the connection terminals 214a is electrically connected to a unique antenna 212 of these antennas 212.

In other embodiment with the common base 214b, when these through holes 214c are arranged in parallel in multiple rows, the through holes 214c of the first row are distanced closer to the circuit board 216, and so the connection terminals 214a in the through holes 214c of the first row may be electrically connected to the circuit board 216 by means of welding or another suitable connection. The connection terminals 214a in the through holes 214c of the second row or another row that is located farther from the circuit board 216 in a vertical direction may be electrically connected to the circuit board 216 by additional flexible wires (not shown in the drawings).

Figure 6:
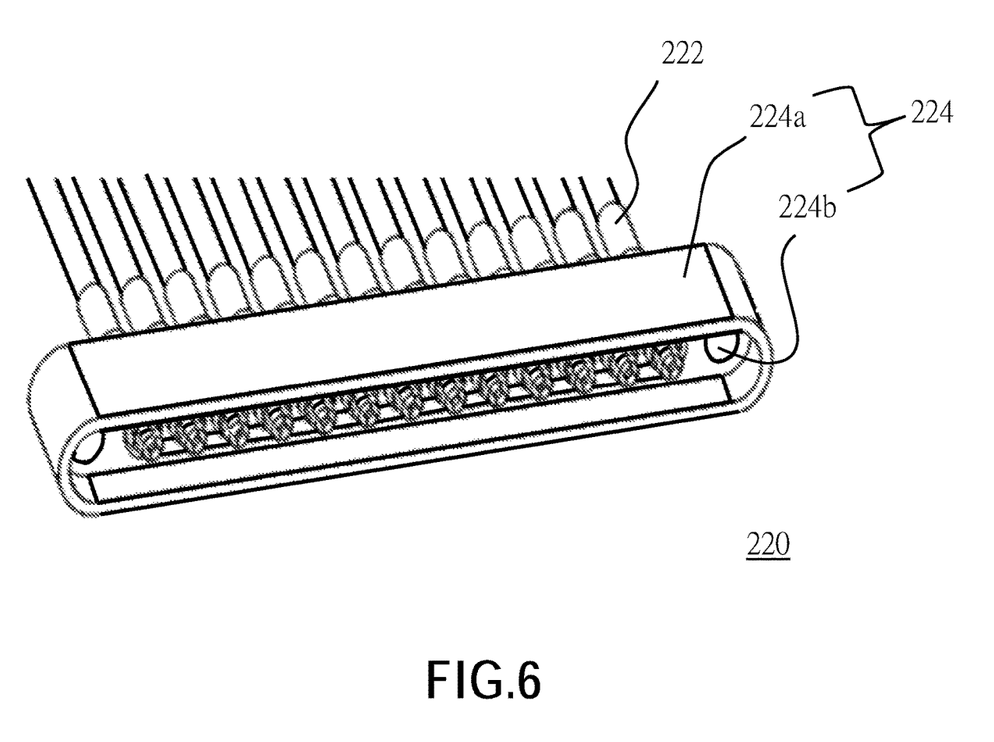
FIG. 6 is a perspective view schematically illustrating a connection wire module such as the connection wire of FIG. 3 from a different angle.

FIG. 6 is a perspective view schematically illustrating a connection wire module such as the connection wire of FIG. 3 from a different angle. Referring to FIG. 2 to FIG. 6, when the second connector 224 of the connection wire module 220 is connected to the first connector 214 of the antenna box 210 as shown in FIG. 2, one end of each of the connection wires 222 disposed at the common base 224a of the second connector 224 is inserted into one corresponding connection terminal 214*a* of these connection terminals 214*a* of the first connector 214. In this embodiment, the first connector 214 includes a pair of magnets 214*d* disposed at the common base 214*b*, the second connector 224 includes another pair of magnets 224*b* disposed at the common base 224*a*, and the first connector 214 and the second connector 224 are adapted to be secured relative to one another by means of the magnetic force attraction between the magnets 214*d* and the magnets 224*b*. The other ends of each of the connection wires 222 of the connection wire module 220 away from the antenna box 210 may be selectively externally connected to another external device (not shown), for example, a network card of another host or a router.

In this embodiment, the housing 218 has a single opening 218*a* located on a side surface 218*b* and the antenna box 210 includes a single first connector 214. In other embodiments, the single opening 218*a* may also be located on another surface of the antenna box 210 such as a top surface 218*c* or a bottom surface 218*d* of the housing 218. When the first connector 214 is located on the top surface 218*c* or the bottom surface 218*d* of the housing 218, the connection terminals 214*a* located in the through holes 214*c* of the first connector 214 may be electrically connected to the circuit boards 216 by means of welding or insertion.

However, in other embodiments, the housing 218 may have another opening and the antenna box 210 may include another connector. The other opening may be located on the same surface or a different surface of the housing 218 such as the first the top surface 218*c*, the bottom surface 218*d* or another side surface 218*e* of the housing 218. The other opening may expose a portion of the other connector. The positions, shapes and sizes of different openings may be the same or different, and the common base may be individually selectively adopted (or omitted). When the other connector is located on the top surface 218*c* or the bottom surface 218*d* of the housing 218, the connection terminals located in the through holes of the other connector may be electrically connected to the circuit board 216 by means of welding or insertion.

Figure 7:
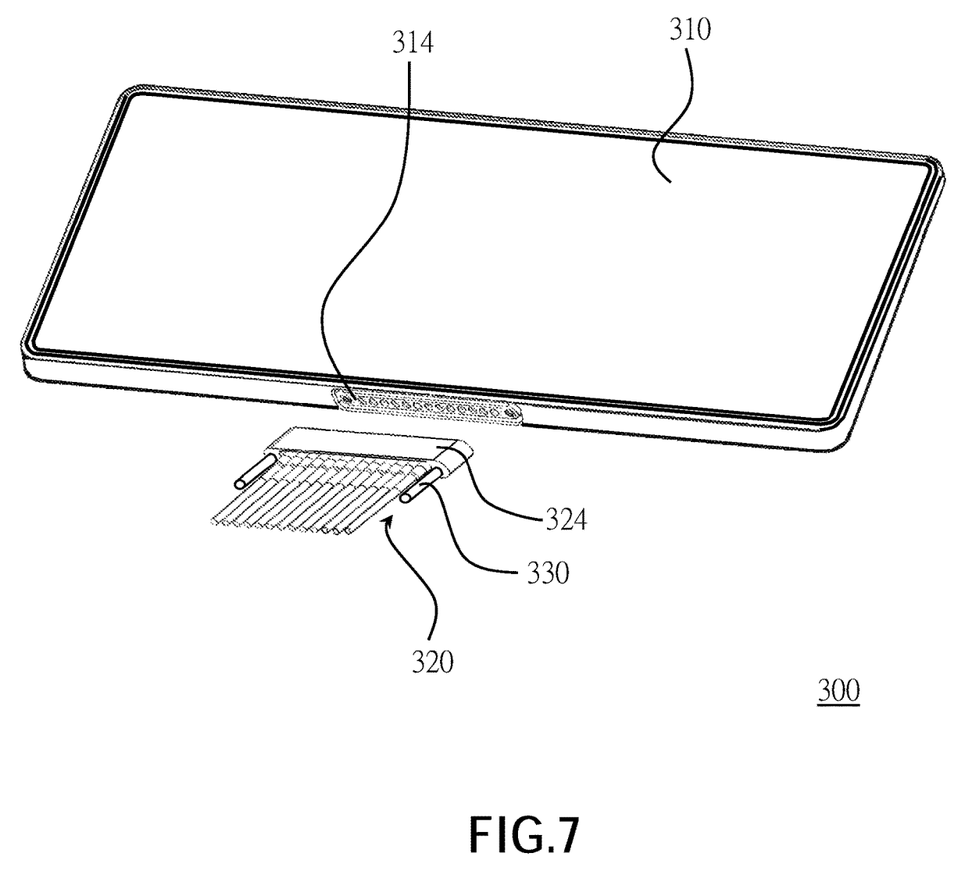
FIG. 7 is a perspective view schematically illustrating another embodiment of an antenna box module, in which an antenna box and a connection wire module are separated.

FIG. 7 is a perspective view schematically illustrating another embodiment of an antenna box module, in which an antenna box and a connection wire module are separated. Referring to FIG. 7 and FIG. 2, an antenna box module 300 of the second embodiment differs from the antenna box module 200 of the first embodiment in that, a first connector 314 of the antenna box 310 of the second embodiment and a second connector 324 of a connection wire module 320 are adapted to be mechanically connected by means of screw fixing. For example, multiple screws 330 are adapted to pass through the second connector 324 so as to be fixed to the first connector 314.

Figure 8:
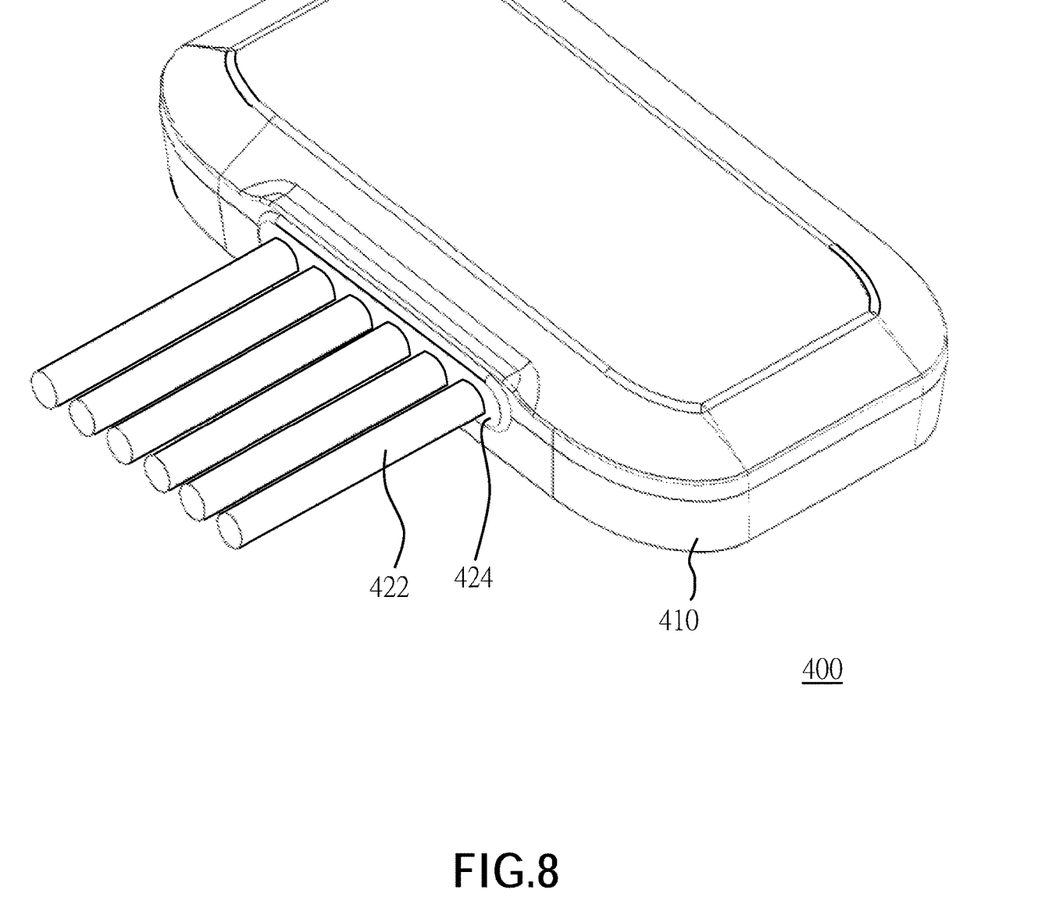
FIG. 8 is a perspective view schematically illustrating another embodiment of an antenna box module.
Figure 9:
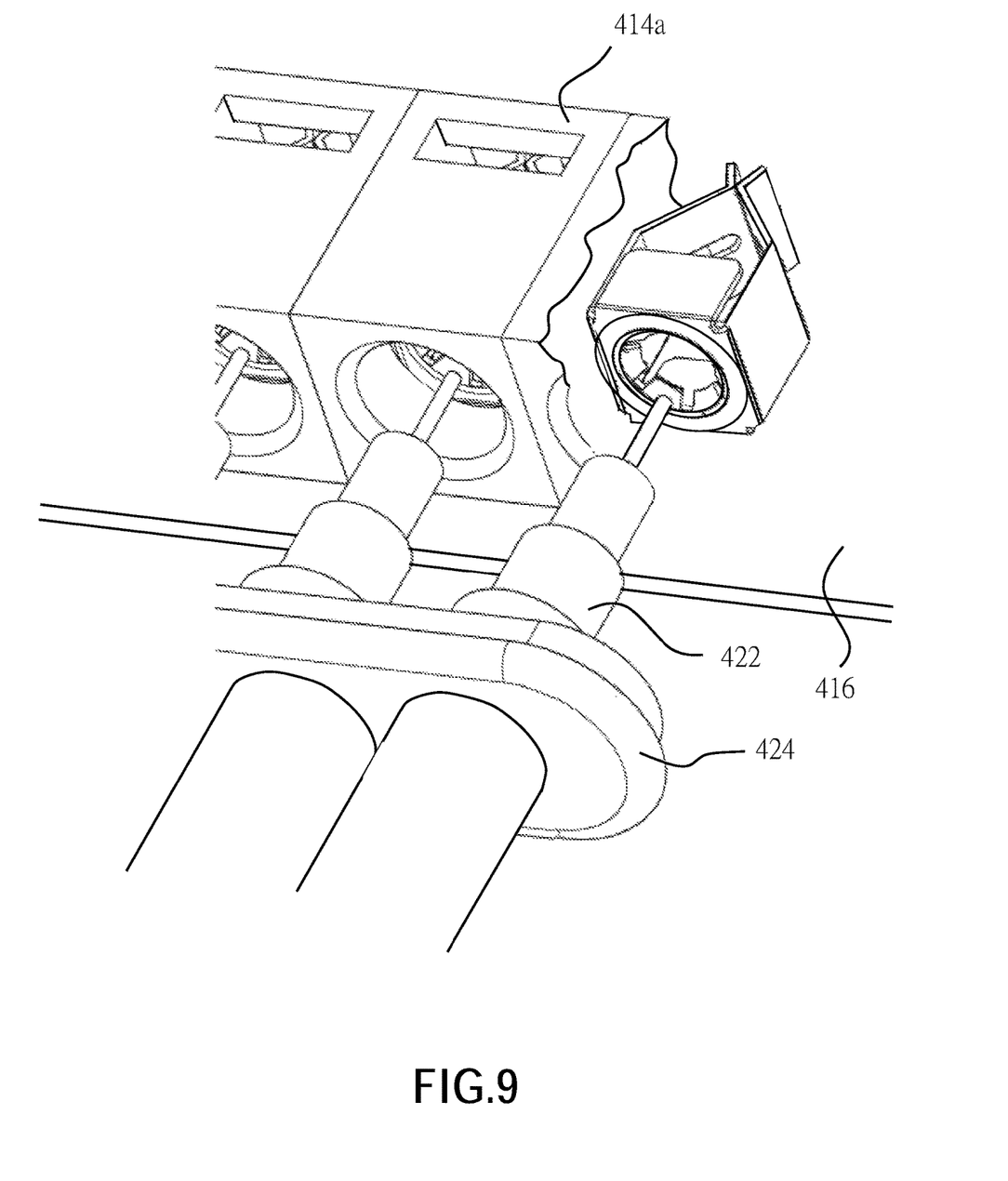
FIG. 9 is a detail perspective view schematically illustrating a section of the antenna box module of FIG. 8.

FIG. 8 is a perspective view schematically illustrating another embodiment of an antenna box module. FIG. 9 is a detail perspective view schematically illustrating a section of the antenna box module of FIG. 8. A cover of one connection terminal 414*a* in FIG. 9 is omitted so as to show the structure therein. Referring to FIG. 8 and FIG. 9, the common base 214*b* of the first connector 214 of the first embodiment is omitted from an antenna box 410 of the third embodiment. In the third embodiment, one end of each connection wire 422 disposed at the second connector 424 may be connected to the corresponding connection terminal 414*a* disposed on the circuit board 416 by means of insertion. In another embodiment, the second connector 424 may also be omitted, and the antenna box module 400 may include a single connection wire 422, which may be connected to the corresponding connection terminal 414*a* in anu suitable fashion, such as by means of insertion or threadlocking or fitting fastening.

Figure 10:
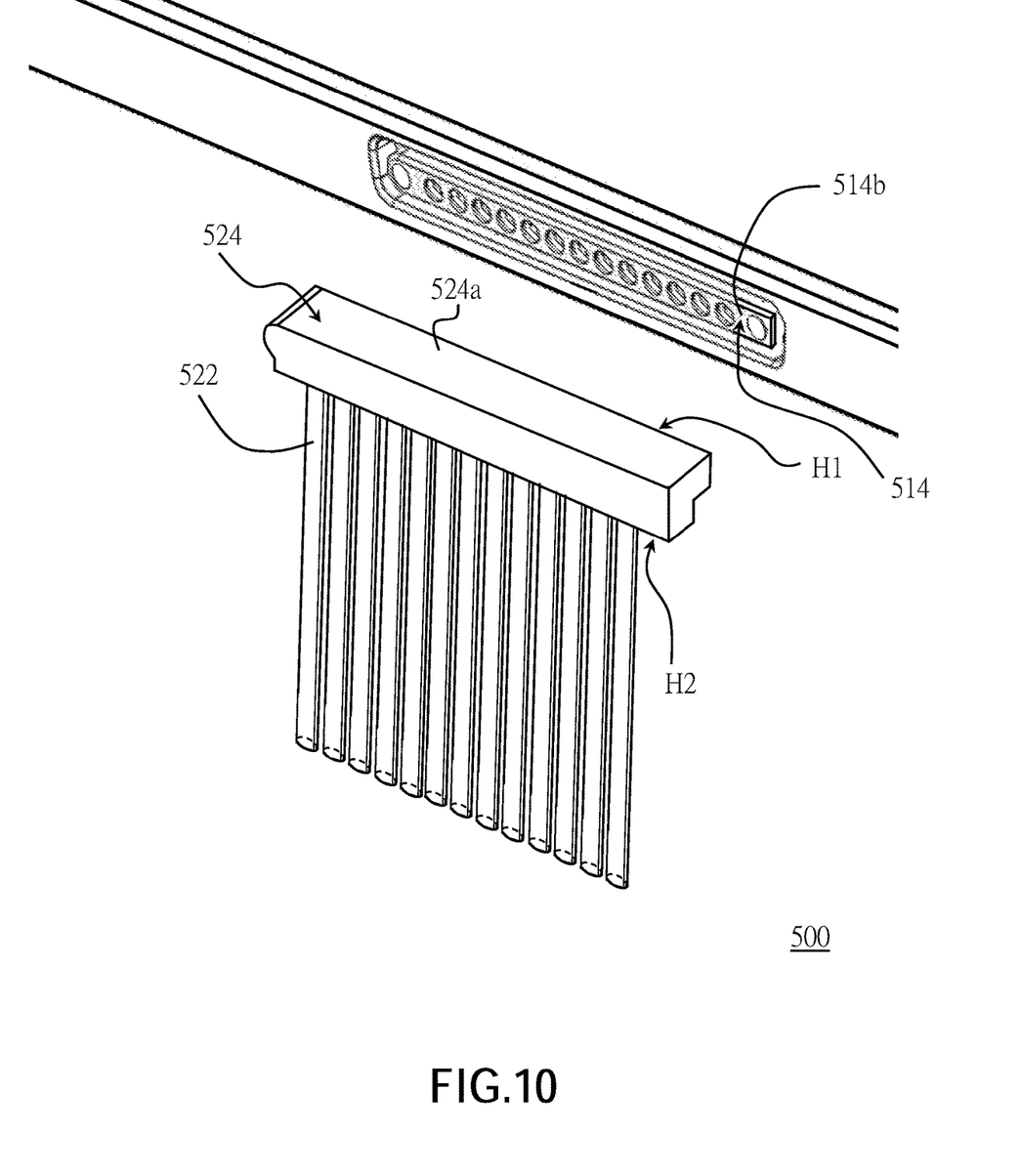
FIG. 10 is a perspective view schematically illustrating another embodiment of an antenna box module.

FIG. 10 is a perspective view schematically illustrating another embodiment of an antenna box module. Referring to FIG. 10, the outer shape of a connection end of a common base 514*b* of a first connector 514 of an antenna box module 500 of the fourth embodiment is not left-right symmetrical, and the outer shape of a connection end of a common base 524*a* of a second connector 524 is not left-right symmetrical. However, the outer shape of the connection end of the common base 514*b* of the first connector 514 and the outer shape of the connection end of the common base 524*a* of the second connector 524 correspond to each other. Thus, the connection means of the second connector 524 and the first connector 514 provides a foolproof mechanism of ensuring that the first and second connectors 514 and 512 are connected in a desired orientation relative to one another, as the asymmetrical shapes will not allow connection in a different orientation.

Further, the common base 524*a* of the second connector 524 has a first hole H1 and a second hole H2. The orientation of the first hole H1 and the orientation of the second hole H2 are not arranged in parallel (for example, perpendicular to each other), and a portion of each connection wire 522 is at least extended into a space between the first hole H1 and the second hole H2. As can be seen in FIG. 10, this provides an angled connection such as a right-angle connection between the connection wires and the first connector 514. The connection wires 522 extend from a surface of the second connector 524 which is not parallel to the surface of the second connector 524 configured to abut the first connector.

Figure 11:
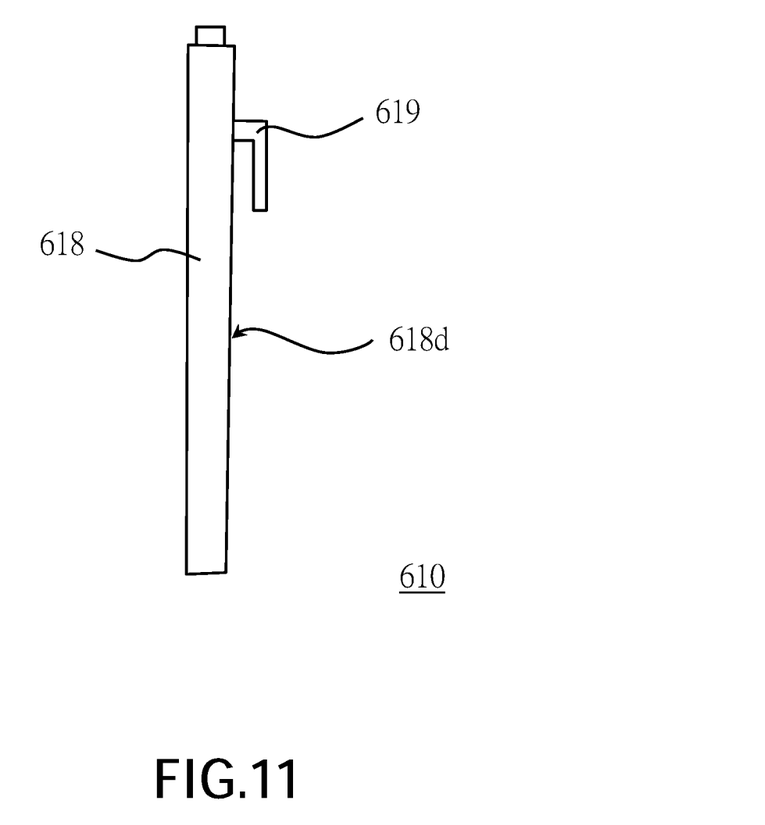
FIG. 11 is a perspective view schematically illustrating another embodiment of an antenna box module.

FIG. 11 is a perspective view schematically illustrating another embodiment of an antenna box module. Referring to FIG. 11, an antenna box 610 of the fifth embodiment includes a bracket 619, which is disposed on a bottom surface 618*d* of a housing 618. The bracket 619 allows a user to readily hang the antenna box 610 on a wall, ceiling, or other surface. Further, in another embodiment, the bracket 619 may be replaced by a double-side adhesive tape so as to adhere the antenna box to a wall by the double-side adhesive tape. It should be noted that the disclosed technology is not limited to the above examples.

In another embodiment, these antennas 212 in FIG. 4 may be completely replaced by other electronic components of different functions. In other words, the sixth embodiment is not limited to an antenna box including antennas, but may be an electronic device including multiple electronic elements (without an antenna function) of different functions, wherein each of the electronic elements is electrically connected to at least one corresponding connection terminals 214*a*. In other embodiments, the antenna housing may include a mix of antenna elements and non-antenna elements, each of which can be connected to an external device by connection wires via one or more connector pairs.

On the basis of the above description, the embodiments of the disclosed technology provide one of the following advantages or other advantages. The antenna box module of one of the embodiments of the disclosed technology includes multiple antennas supporting multiple wireless communication standards. Therefore, compared to other embodiments, the antenna box module has a broader applied range in practice. Further, the connection between the connection wire module of the antenna box module and the antenna box of one of the embodiments of the disclosed technology is not a fixed connection, but is a detachable connection. Therefore, the antenna box module of one of the embodiments of the disclosed technology is more flexible and simpler in terms of portability and assembly. Further, in particular, connections of multiple antennas may be simultaneously completed through the connection of the common base of the first connector and the common base of the second connector, significantly improving convenience for connection without involving connections of individual antennas as in other embodiments, and being free from limitations of the number of antennas in practice.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An antenna module, comprising:
   a housing comprising a first opening;
   a first antenna disposed within the housing and adapted to receive or transmit wireless signals according to a first wireless communication standard;
   a second antenna disposed within the antenna housing and adapted to receive or transmit wireless signals according to a second wireless communication standard different than the first wireless communication standard;
   a first connection terminal in electrical communication with the first antenna;
   a second connection terminal in electrical communication with the first antenna, the first opening in the housing exposing portions of the first and second terminals; and
   a first connection wire, wherein a first end of the first connection wire is configured to be connected to the first connection terminal to place the first antenna in electrical communication with the first connection wire via the connection of the first connection terminal with the first connection wire.

2. The antenna module of claim 1, wherein the first end of the first connection wire is configured to be connected to the first connection terminal via insertion, thread-locking, or fitting fastening.

3. The antenna module of claim 1, wherein the first opening is located in a side surface, a top surface or a bottom surface of the housing.

4. The antenna module of claim 1, wherein the antenna module further comprises a plurality of other antennas and a plurality of other connection terminals, and the other antennas are electrically connected to the other connection terminals, respectively.

5. The antenna module of claim 4, wherein the first opening further exposes collectively portions of the each of the other connection terminals, and the first, second and other connection terminals are arranged in parallel in at least one row.

6. The antenna module of claim 4, wherein the housing further comprises a second opening exposing collectively portions of the each of the other connection terminals, and wherein the first and second opening are located in different surfaces of the housing.

7. The antenna module of claim 1, further comprising a circuit board disposed within the housing, wherein the first and second antennas and the first and second connection terminals are disposed on the circuit board, and wherein the first and second connection terminals are disposed on the circuit board via soldering or insertion.

8. The antenna module of claim 1, further comprising:
   a first connector disposed at least partially within the first opening of the housing, wherein the first and second connection terminals are disposed at the first connector; and
   a connection wire module comprising:
      the first connection wire,
      a second connection wire, and
      a second connector, wherein the first end of the first connection wire and a first end of the second connection wire are connected to the second connector, and wherein the second connector is configured to be connected to the first connector such that simultaneously,
         the first antenna is configured to be placed in electrical communication with the first connection wire via the connection of the first connector with the second connector, and
         the second antenna is configured to be electrically connected to the second connection wire via the connection of the first connector with the second connector.

9. The antenna module of claim 8, wherein the second connector is configured to be secured relative to the first connector via magnetic force or screw-locking.

10. The antenna module of claim 8, wherein the first connector comprises a first shared base partially disposed in the first opening and comprising a plurality of through holes, and wherein the first and second connection terminals are disposed at and occupy at least a portion of the through holes in the shared base.

11. The antenna module of claim 8, wherein the first connector is configured to provide an electrical connection with each of the antennas disposed within the housing.

12. The antenna module of claim 8, wherein the second connector comprises a second shared base, and wherein the first end of each of the first and second connection wires is disposed at the second shared base.

13. The antenna module of claim 12, wherein the second common base comprises a first face configured to abut the first connector and a second face through which each of the first and second connection wires extend, and wherein the first face is oriented at a non-zero angle to the second face.

14. An antenna box, comprising:
   a housing;
   a first antenna located within the housing and configured to receive or transmit wireless signals according to a first wireless communication standard;
   a first connection terminal in electrical communication with the first antenna, the first connection terminal at least partially exposed via a first opening in the housing;

a second antenna located within the housing and configured to receive or transmit wireless signals according to a second wireless communication standard different from the first wireless communication standard; and a second connection terminal in electrical communication with the second antenna, the second connection terminal at least partially exposed via the first opening in the housing.

15. The antenna box of claim 14, wherein the first opening is located in one of a side surface, a top surface or a bottom surface of the housing.

16. The antenna box of claim 15, further comprising a plurality of other antennas respectively in electrical communication with a corresponding plurality of other connection terminals.

17. The antenna box of claim 16, wherein the first opening exposes a portion of each of the other connection terminals.

18. The antenna box of claim 16, wherein the housing further comprises a second opening a portion of each of the other connection terminals, and wherein the first and second opening are located in different surfaces of the housing.

19. The antenna box according to claim 14, further comprising a circuit board located at least partially within the housing, wherein the first and second antennas and the first and second connection terminals are supported by the circuit board, and the first and second connection terminals are connected to the circuit board via soldering or insertion.

20. The antenna box according to claim 15, further comprising a connector including a shared base, wherein the shared base is partially disposed in the first opening and comprises a plurality of through holes, and wherein the first and second connection terminals are disposed at and occupy at least a portion of the through holes in the shared base.

* * * * *